United States Patent
Shimizu

(10) Patent No.: US 11,588,981 B2
(45) Date of Patent: Feb. 21, 2023

(54) CONTROL APPARATUS, CONTROL METHOD, AND STORAGE MEDIUM

(71) Applicant: CANON KABUSHIKI KAISHA, Tokyo (JP)

(72) Inventor: Rurika Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 17/075,208

(22) Filed: Oct. 20, 2020

(65) Prior Publication Data

US 2021/0127048 A1    Apr. 29, 2021

(30) Foreign Application Priority Data

Oct. 29, 2019    (JP) .............................. JP2019-196615

(51) Int. Cl.
  *H04N 5/235*   (2006.01)
  *G06F 3/16*    (2006.01)
  *G10L 15/22*   (2006.01)

(52) U.S. Cl.
  CPC ........... *H04N 5/2353* (2013.01); *G06F 3/165* (2013.01); *G06F 3/167* (2013.01); *G10L 15/22* (2013.01); *G10L 2015/223* (2013.01)

(58) Field of Classification Search
  CPC ......... G10L 15/10; G10L 15/20; G10L 15/28; H04N 5/91
  USPC ............ 348/73, 159, 208.12, 208.16, 240.99
  See application file for complete search history.

(56) References Cited

FOREIGN PATENT DOCUMENTS

JP    2014-122978 A    7/2014
JP    2014122978    *   7/2014    ............. G10L 15/10

* cited by examiner

*Primary Examiner* — Yosef K Laekemariam
(74) *Attorney, Agent, or Firm* — Canon U.S.A., Inc. IP Division

(57) ABSTRACT

There is provided a control apparatus. A first acquiring unit acquires a user instruction identified through voice recognition. A determining unit determines a current state of an image capturing apparatus. In response to a first user instruction being acquired as the user instruction, a control unit: controls the image capturing apparatus to perform first processing in a case where the current state is a shooting state; and controls the image capturing apparatus to perform second processing in a case where the current state is a playback/display state or a menu display state.

23 Claims, 9 Drawing Sheets

FIG. 5

| | VOICE RECOGNITION RESULT | SHOOTING STATE | MENU DISPLAY STATE | PLAYBACK/DISPLAY STATE | COMMUNICATION STATE |
|---|---|---|---|---|---|
| 1 | MAKE IT BRIGHTER (BRIGHTNESS) | INCREASE EXPOSURE | BRIGHTEN SCREEN | BRIGHTEN SCREEN | BRIGHTEN SCREEN |
| 2 | MAKE IT DARKER | DECREASE EXPOSURE | DIM SCREEN | DIM SCREEN | DIM SCREEN |
| 3 | ENLARGE THAT (ENLARGEMENT/REDUCTION) | ENLARGE LV IMAGE | ENLARGE FONT | ENLARGE PHOTOGRAPH | ENLARGE FONT |
| 4 | REDUCE THAT | REDUCE LV IMAGE | REDUCE FONT | REDUCE PHOTOGRAPH | REDUCE FONT |
| 5 | ZOOM IN (ZOOMING IN/OUT) | ZOOM IN LENS | ENLARGE SCREEN | | |
| 6 | ZOOM OUT | ZOOM OUT LENS | DISPLAY SCREEN NORMALLY | | |
| 7 | MUTE THE SOUND | USE SILENT SHUTTER | TURN OPERATION SOUND OFF | TURN OPERATION SOUND OFF | |
| 8 | CLEAR THAT | DISPLAY OFF | DISPLAY OFF | DELETE PHOTOGRAPH | |

CONTROL APPARATUS, CONTROL METHOD, AND STORAGE MEDIUM

BACKGROUND

Field

The present disclosure relates to a control apparatus, a control method, and a storage medium.

Description of the Related Art

Recently, image capturing apparatuses provided with voice operation functions are known, where when voice is input, the apparatus recognizes the details of the input and can perform an operation corresponding to the result of the recognition. Voice operation is useful for operations involving many steps or complex operations that are difficult to remember and enables an operation to be performed with single voice input. However, simple voice operation which determines processing details from input details alone may result in the image capturing apparatus performing processing, which does not correspond to the user's intentions. In this case, the operation must be done over, which increases the user's burden.

Accordingly, using information aside from the details of voice input as a reference for voice recognition, determining the details of processing, and the like are conceivable to increase the likelihood that the processing will correspond to the user's intentions. Another technique is known, for example, in which whether a voice input made during the shooting performed by the operator of an image capturing apparatus or a subject is identified, and processing pertaining to shooting is then carried out having changed voice recognition conditions in accordance with a result of the identification (see Japanese Patent Laid-Open No.

An image capturing apparatus itself can be in a variety of states, including a shooting state, in which images can be shot; a menu display state, in which settings of the image capturing apparatus can be changed; a playback/display state, in which images which have been shot can be browsed; and others. Depending on the state of the image capturing apparatus, it is possible that a user will use the same word or phrase with different intentions when performing voice input. For example, if the user makes a voice input by saying "make it brighter" during the shooting state, it can be assumed that they wish to increase the exposure, which is a setting pertaining to shooting. On the other hand, if the user makes the same voice input of "make it brighter" during the playback/display state or the menu display state, it is possible that they wish to increase not the exposure, but the brightness of the display instead.

However, Japanese Patent Laid-Open No. 2014-122978 does not take into account the possibility that a user's intentions may differ between the shooting state, and the playback/display state or the menu display state.

SUMMARY

The present disclosure provides a technique that improves the likelihood of processing matching a user's intentions being performed when controlling processing by an image capturing apparatus through voice recognition.

According to a first aspect of the present disclosure, a control apparatus is provided comprising: a first acquiring unit configured to acquire a user instruction identified through voice recognition; a determining unit configured to determine a current state of an image capturing apparatus; and a control unit configured to, in response to a first user instruction being acquired as the user instruction: control the image capturing apparatus to perform first processing in a case where the current state is a shooting state; and control the image capturing apparatus to perform second processing in a case where the current state is a playback/display state or a menu display state.

According to a second aspect of the present disclosure, there is provided a control apparatus comprising: a first acquiring unit configured to acquire a user instruction identified through voice recognition; a determining unit configured to determine a current state of an image capturing apparatus; an identifying unit configured to identify processing which corresponds to the user instruction and which can be executed by the image capturing apparatus; and a control unit configured to: in a case where one type of processing has been identified by the identifying unit, control the image capturing apparatus to perform the identified one type of processing; and in a case where a plurality of types of processing have been identified by the identifying unit: control the image capturing apparatus to perform processing, of the plurality of types of processing which have been identified, that is associated with a first state, if the current state is the first state; and control the image capturing apparatus to perform processing, of the plurality of types of processing which have been identified, that is associated with a second state, if the current state is the second state.

According to a third aspect of the present disclosure, there is provided a control method executed by a control apparatus, comprising: acquiring a user instruction identified through voice recognition; determining a current state of an image capturing apparatus; and in response to a first user instruction being acquired as the user instruction: controlling the image capturing apparatus to perform first processing in a case where the current state is a shooting state; and controlling the image capturing apparatus to perform second processing in a case where the current state is a playback/display state or a menu display state.

According to a fourth aspect of the present disclosure, there is provided a control method executed by a control apparatus, comprising: acquiring a user instruction identified through voice recognition; determining a current state of an image capturing apparatus; identifying processing which corresponds to the user instruction and which can be executed by the image capturing apparatus; in a case where one type of processing has been identified, controlling the image capturing apparatus to perform the identified one type of processing; and in a case where a plurality of types of processing have been identified: controlling the image capturing apparatus to perform processing, of the plurality of types of processing which have been identified, that is associated with a first state, if the current state is the first state; and controlling the image capturing apparatus to perform processing, of the plurality of types of processing which have been identified, that is associated with a second state, if the current state is the second state.

According to a fifth aspect of the present disclosure, there is provided a non-transitory computer-readable storage medium which stores a program for causing a computer to execute a control method comprising: acquiring a user instruction identified through voice recognition: determining a current state of an image capturing apparatus; and in response to a first user instruction being acquired as the user instruction: controlling the image capturing apparatus to perform first processing in a case where the current state is a shooting state; and controlling the image capturing apparatus to perform second processing in a case where the current state is a playback/display state or a menu display state.

According to a sixth aspect of the present disclosure, there is provided a non-transitory computer-readable storage medium which stores a program for causing a computer to execute a control method comprising: acquiring a user instruction identified through voice recognition; determining a current state of an image capturing apparatus; identifying processing which corresponds to the user instruction and which can be executed by the image capturing apparatus; in a case where one type of processing has been identified, controlling the image capturing apparatus to perform the identified one type of processing; and in a case where a plurality of types of processing have been identified: controlling the image capturing apparatus to perform processing, of the plurality of types of processing which have been identified, that is associated with a first state, if the current state is the first state; and controlling the image capturing apparatus to perform processing, of the plurality of types of processing which have been identified, that is associated with a second state, if the current state is the second state.

Further features will become apparent from the following description of exemplary embodiments with reference to the attached drawings.

BRIEF DESCRIPTION OF THE DRAWINGS

FIG. 5 is a table showing an example of processing details selected in accordance with the voice recognition results and the state of the digital camera 100, in accordance with the voice control processing described with reference to FIGS. 3A to 3D.

DESCRIPTION OF THE EMBODIMENTS

Figure 1A:
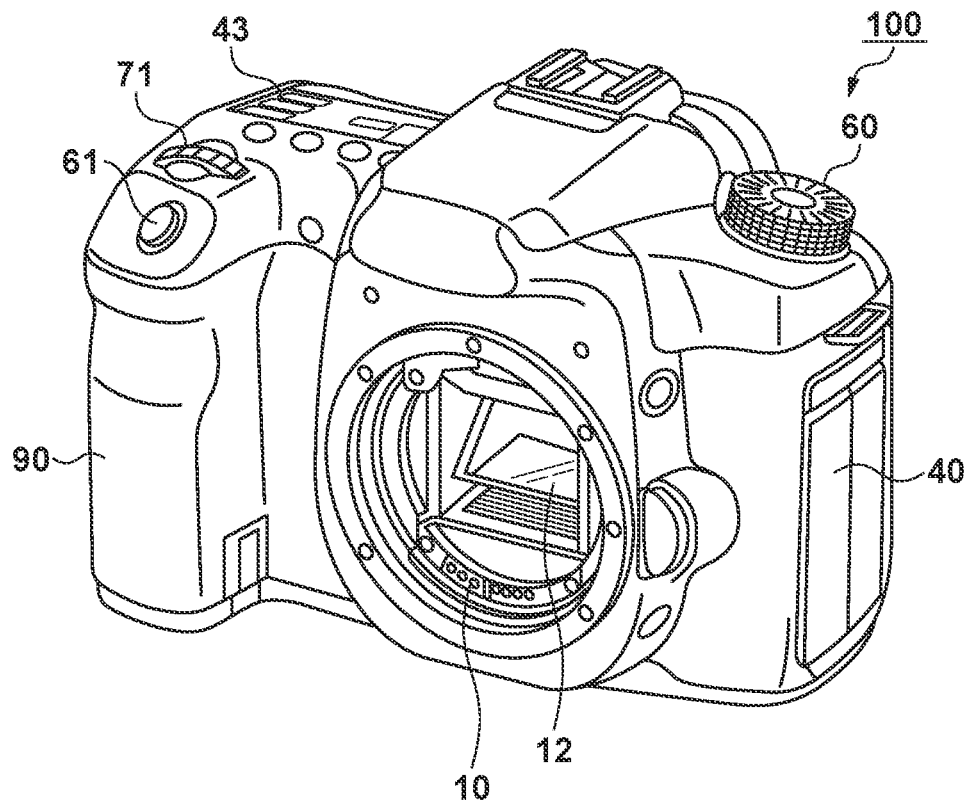
FIGS. 1A and 1B illustrate views of an example of a digital camera.

Hereinafter, embodiments will be described in detail with reference to the attached drawings. Note, the following embodiments are not intended to limit the scope of the claimed disclosure. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

Figure 1B:
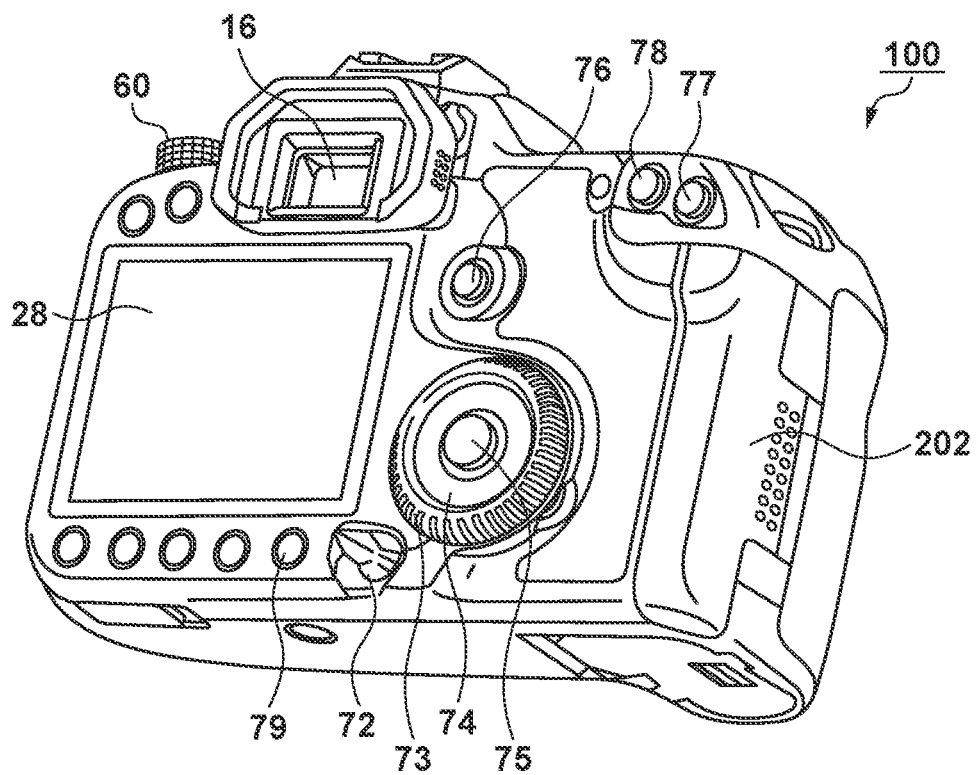

FIGS. 1A and 1B are exterior views of a digital camera 100 serving as an example of an apparatus to which the present disclosure can be applied. FIG. 1A is a front perspective view of the digital camera 100, and FIG. 1B is a rear perspective view of the digital camera 100.

In FIGS. 1A and 1B, a display unit 28 is provided in a rear surface of the camera, that displays images, various types of information, and the like. An outside-viewfinder display unit 43 is a display unit provided in a top surface of the camera, and displays various setting values of the camera, including shutter speed and aperture. A shutter button 61 is an operation unit for making a shooting instruction. A mode changing switch 60 is an operation unit for switching among various types of modes. A terminal cover 40 is a cover for protecting a connector (not shown) for a connection cable or the like that connects the digital camera 100 to an external device.

Figure 2:
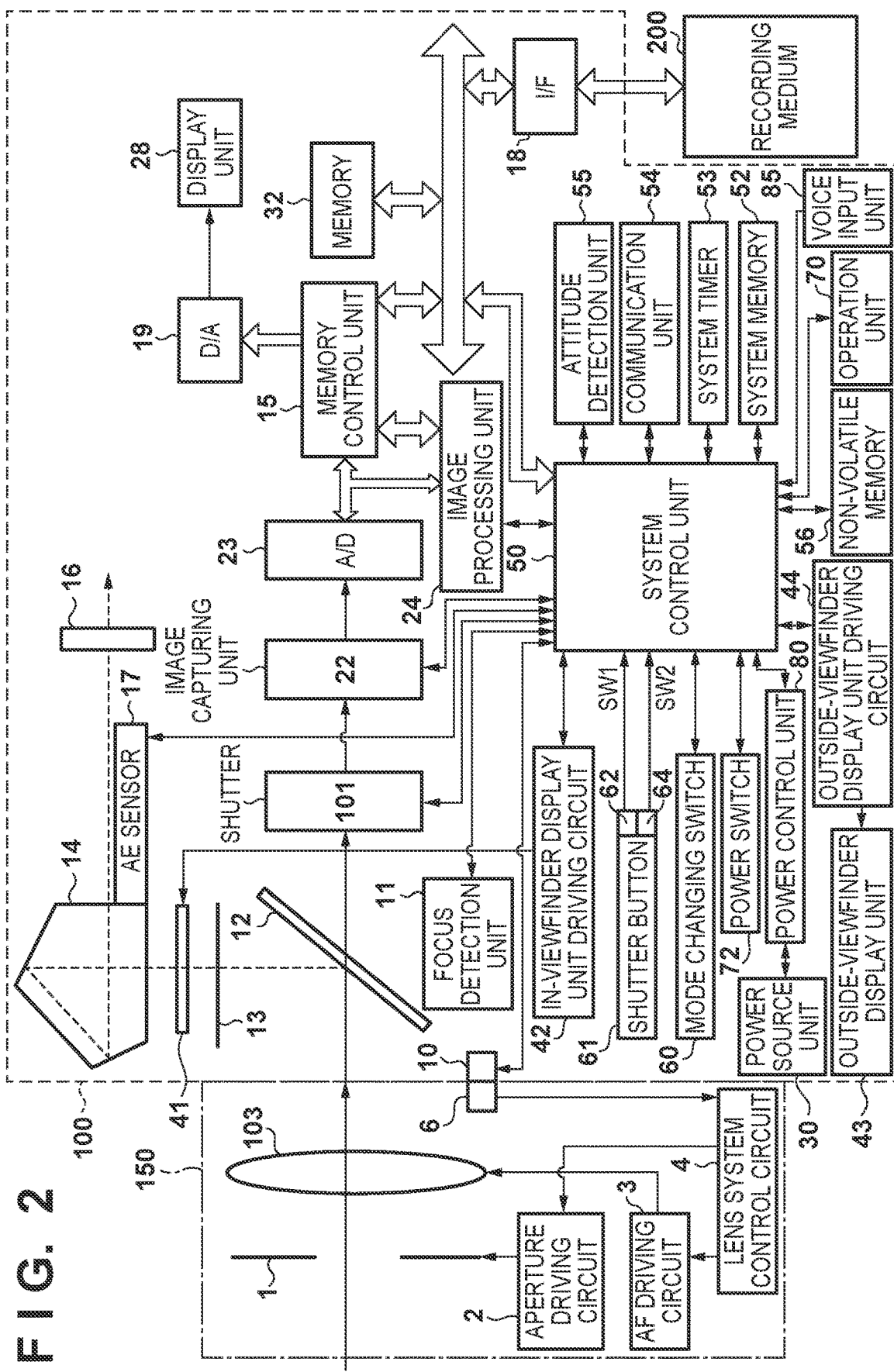
FIG. 2 illustrate a block diagram illustrating an example of the configuration of the digital camera 100.

A main electronic dial 71 is a rotating operation member included in an operation unit 70, illustrated in FIG. 2, and setting values such as the shutter speed and aperture can be changed or the like by rotating the main electronic dial 71. A power switch 72 is an operation member that switches the power of the digital camera 100 on and off. A sub electronic dial 73 is a rotating operation member included in the operation unit 70, and can be used to move a selection frame, cycle through images, and so on. A directional key 74 is a directional key (a four-direction key), included in the operation unit 70, having top, bottom, left, and right parts that can be pressed. Operations can be made in accordance with the part of the directional key 74 which has been pressed. A set button 75 is a pushbutton included in the operation unit 70, and is used mainly to confirm selected items. An LV button 76 is a button, included in the operation unit 70, that switches a live view ("LV" hereinafter) on and off. In a moving image shooting mode, the LV button 76 is used to instruct moving image shooting (recording) to start and stop. An enlarge button 77 is an operation button, included in the operation unit 70, for switching an enlarged mode on and off during a live view display in a shooting mode, and for changing the magnification during the enlarged mode. In a playback mode, the enlarge button 77 functions as an enlarging button for enlarging the displayed image and increasing the magnification. A reduce button 78 is a button, included in the operation unit 70, for reducing the magnification of a display image that has been enlarged, and reducing the displayed image. A playback button 79 is an operation button, included in the operation unit 70, that switches between the shooting mode and the playback mode. Pressing the playback button 79 during the shooting mode causes a transition to the playback mode, and the newest image among images recorded in a recording medium 200, illustrated in FIG. 2, can be displayed in the display unit 28.

A quick-return mirror 12 is flipped up and down by an actuator (not shown) in response to an instruction from a system control unit 50, illustrated in FIG. 2. A communication terminal 10 is a communication terminal through which the digital camera 100 communicates with a (removable) lens. An ocular viewfinder 16 is a look-through type viewfinder through which a user observes a focusing screen 13, illustrated in FIG. 2. By observing the focusing screen 13 through the ocular viewfinder 16, the user can confirm the focus, composition, and so on of an optical image of a subject obtained through a lens unit 150. A cover 202 is a cover for a slot in which the recording medium 200 is held. A grip part 90 is a holding part having a shape that the user can easily grip with his/her right hand while holding the digital camera 100.

FIG. 2 is a block diagram illustrating an example of the configuration of the digital camera 100. In FIG. 2, the lens unit 150 is an interchangeable lens unit including a shooting lens. A lens 103 is normally constituted by a plurality of lenses, but only one lens is shown here for the sake of simplicity. A communication terminal 6 is a communication terminal through which the lens unit 150 communicates with the digital camera 100, and the communication terminal 10 is a communication terminal through which the digital camera 100 communicates with the lens unit 150. The lens unit 150 communicates with the system control unit 50 through the communication terminals 6 and 10, controls an aperture stop 1 through an aperture driving circuit 2 using an internal lens system control circuit 4, and adjusts the focus by changing the position of the lens 103 through an AF driving circuit 3.

An AE sensor 17 measures the luminance of a subject through the lens unit 150. A focus detection unit 11 outputs defocus amount information to the system control unit 50. The system control unit 50 carries out phase detection AF by controlling the lens unit 150 on the basis of the defocus amount information.

The quick-return mirror 12 is flipped up and down by an actuator (not shown) in response to instructions from the system control unit 50 during exposure, live view shooting, and moving image shooting. The quick-return mirror 12 is a mirror that switches a light beam incident through the lens 103 between the ocular viewfinder 16 side and an image capturing unit 22 side. Although the quick-return mirror 12 is normally positioned so as to reflect the light beam toward the ocular viewfinder 16, the quick-return mirror 12 is raised upward and retracted from the light beams so that the light beams are guided to the image capturing unit 22 (mirror up) during shooting, live view display, and the like. Additionally, the quick-return mirror 12 is a half mirror so that some light can pass through a central part thereof, and thus some of the light beams are transmitted so as to enter the focus detection unit 11 for the purpose of focus detection.

By observing the focusing screen 13 through a pentaprism 14 and the ocular viewfinder 16, the user can confirm the focus, composition, and so on of the optical image of a subject obtained through the lens unit 150.

A shutter 101 is a focal plane shutter through which the exposure time of the image capturing unit 22 can be freely controlled under the control of the system control unit 50. The image capturing unit 22 is an image sensor constituted by a CCD, a CMOS element, or the like that converts an optical image into an electrical signal. An A/D converter 23 converts analog signals into digital signals. The A/D converter 23 is used to convert analog signals output from the image capturing unit 22 into digital signals.

An image processing unit 24 carries out prescribed pixel interpolation, resizing processing such as reduction, color conversion processing, and the like on data from the A/D converter 23 or data from a memory control unit 15. The image processing unit 24 also performs prescribed computational processing using captured image data, and a system control unit 50 performs exposure control and rangefinding control based on results obtained from these computations. A TTL (through-the-lens) AF (autofocus) process, an AE (automatic exposure) process, and an EF (flash pre-emission) process are realized as a result. The image processing unit 24 also performs predefined computations using the captured image data, performing a TTL AWB (auto white balance) process on the basis of the results thereof.

Data output from the A/D converter 23 is written into memory 32 through the image processing unit 24 and the memory control unit 15, or directly through the memory control unit 15. The memory 32 stores the image data obtained by the image capturing unit 22 and converted into digital data by the A/D converter 23, image data for display in the display unit 28, and the like. The memory 32 is provided with a storage capacity sufficient to store a predetermined number of still images, a predetermined time's worth of moving images and audio, and so on.

The memory 32 also functions as image display memory (video memory). A D/A converter 19 converts data for image display, stored in the memory 32, into an analog signal and supplies the analog signal to the display unit 28. Image data for display written into the memory 32 thus displayed by the display unit 28 via the D/A converter 19 in this manner. The display unit 28 carries out a display in the display device, which is an LCD or the like, based on the analog signal from the D/A converter 19. By using the D/A converter 19 to convert the digital signals A/D converted by the A/D converter 23 and stored in the memory 32 into analog signals and then sequentially transferring and displaying those signals in the display unit 28, the display unit 28 functions as an electronic viewfinder. A through-the-lens image display (live view display) can be carried out as a result.

A frame indicating a rangefinding point where autofocus is currently being carried out (an AF frame), icons expressing the state of settings in the camera, and so on are displayed in an in-viewfinder display unit 41 through an in-viewfinder display unit driving circuit 42.

Various setting values of the camera, including shutter speed and aperture, are displayed in the outside-viewfinder display unit 43 through an outside-viewfinder display unit driving circuit 44.

Non-volatile memory 56 is electrically erasable/recordable memory, and, for example, EEPROM is used. Operational constants, programs, and so on of the system control unit 50 are stored in the non-volatile memory 56. Here, "programs" refers to programs for executing the various flowcharts according to the present embodiment, which will be described later.

The system control unit 50 is a control unit constituted by at least one processor or circuit, and controls the entire digital camera 100. The respective processes according to the present embodiment, mentioned later, are realized by executing programs recorded in the non-volatile memory 56 mentioned above. 52 indicates system memory, for which RAM is used. Operational constants and variables for the system control unit 50, programs read out from the non-volatile memory 56, and so on are loaded into system memory 52. The system control unit 50 also carries out display control by controlling the memory 32, the D/A converter 19, the display unit 28, and so on.

A system timer 53 is a time measurement unit that measures times used in various types of control, measures the time of an internal and clock, and so on.

The mode changing switch 60, a first shutter switch 62, a second shutter switch 64, and the operation unit 70 are operation members for inputting various types of operation instructions to the system control unit 50. The mode changing switch 60 switches the operating mode of the system control unit 50 among a still image recording mode, the moving image shooting mode, the playback mode, and so on. The still image recording mode includes an auto shooting mode, an auto scene determination mode, a manual mode, an aperture priority mode (Av mode), and a shutter speed priority mode (Tv mode). There are also various types of scene modes, a program AE mode, custom modes, and the like as shooting settings for different shooting scenes. The mode changing switch 60 can be used to switch directly to any one of these modes. Alternatively, the mode changing switch 60 may first be used to switch to a screen listing the shooting modes, where one of the plurality of modes which is displayed is selected and another operation member is then used to switch to that mode. Likewise, the moving image shooting mode may include a plurality of modes.

The first shutter switch 62 switches on partway through the operation of the shutter button 61 provided in the digital camera 100, or in other words, when the button is depressed halfway (a shooting preparation instruction), and produces a first shutter switch signal SW1. Operations such as AF (autofocus) processes, AE (automatic exposure) processes, AWB (auto white balance) processes, and EF (flash pre-emission) processes are started by the first shutter switch signal SW1.

The second shutter switch 64 turns on when the shutter button 61 is completely operated, or in other words, is fully depressed (a shooting instruction), and produces a second shutter switch signal SW2. The system control unit 50 commences a series of shooting processes, from reading out signals from the image capturing unit 22 to writing image data into a recording medium 200, in response to the second shutter switch signal SW2.

Functions relevant for different situations are assigned to operation members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. The user can make various types of settings intuitively using the menu screen displayed in the display unit 28, along with the four, i.e., the up, down, left, and right, directional keys (the directional key 74), the set button 75, and so on.

The operation unit 70 includes various types of operation members as input units for accepting operations from the user. The operation unit 70 includes at least the following operation members. These units include the shutter button 61, the main electronic dial 71, the power switch 72, the sub electronic dial 73, the directional key 74, the set button 75, the LV button 76, the enlarge button 77, the reduce button 78, and the playback button 79.

A power control unit 80 is constituted by a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200. A power source unit 30 includes a primary battery such as an alkali battery, a lithium battery, or the like, a secondary battery such as a NiCd battery, a NiMIH battery, a Li battery, or the like, or an AC adapter.

A recording medium I/F 18 is an interface for the recording medium 200 such as a memory card, a hard disk, or the like. The recording medium 200 is a recording medium for recording shot images, such as a memory card or the like, and is constituted by semiconductor memory, a magnetic disk, or the like.

A communication unit 54 is connected to an external device wirelessly or over a wired cable, and sends and receives video signals, audio signals, and the like. The communication unit 54 can also connect to a wireless LAN (local area network), the Internet, and so on. The communication unit 54 can transmit images captured by the image capturing unit 22 (including through-the-lens image), images recorded in the recording medium 200, and the like, and can also receive image data and various other types of information from the external device.

An attitude detection unit 55 detects the attitude of the digital camera 100 relative to the gravitational direction. Whether an image shot by the image capturing unit 22 is an image shot while the digital camera 100 was held horizontally or vertically can be determined on the basis of the attitude detected by the attitude detection unit 55. The system control unit 50 can add orientation information based on the attitude detected by the attitude detection unit 55 to the image file of an image captured by the image capturing unit 22, record the image in a rotated state, and so on. An accelerometer, a gyrosensor, or the like can be used as the attitude detection unit 55.

A voice input unit 85 is constituted by a microphone (not shown), and performs processing for obtaining sounds.

The present disclosure is not limited to an image capturing apparatus body such as the digital camera 100, and the various configurations and operations of the present embodiment can also be applied in a control apparatus that communicates with an image capturing apparatus (including a network camera) through wired or wireless communication and remotely controls the image capturing apparatus. A smartphone, a tablet PC, a desktop PC, and the like can be given as examples of control apparatuses that remotely control the image capturing apparatus. The image capturing apparatus can be controlled remotely by the control apparatus communicating commands for carrying out various types of operations, settings, and the like to the image capturing apparatus on the basis of operations made in the control apparatus, processes carried out by the control apparatus, and the like. Additionally, a live view image shot by the image capturing apparatus may be received by the control apparatus through wired or wireless communication and displayed.

Voice control processing according to the first embodiment will be described next with reference to FIGS. 3A to 5. FIGS. 3A to 3D are flowcharts illustrating the voice control processing according to the first embodiment. Unless otherwise specified, the processing in each step of these flowcharts is realized by the system control unit 50 executing programs stored in the non-volatile memory 56 and loaded into the memory 32. The processing of these flowcharts is started after the digital camera 100 has been started up or when the digital camera 100 is in a state capable of being operated by voice.

In step S301, the system control unit 50 determines whether or not voice input has started. A method in which a specific word or phrase is detected from the voice input unit 85 can be used as the method for determining the start of voice input. To detect a specific word or phrase, the waveform of an audio signal of the specific word or phrase may be recorded in advance, which may then be compared with the waveform of voice which has been acquired to determine whether or not the waveforms are similar to each other by greater than or equal to a certain degree. Or, a trained model which has been trained for the purpose of detection using supervisory data may be prepared using the audio signal of the specific word or phrase as an input, and the trained model may be caused to make an inference using the acquired voice as an input. Alternatively, a determination method based on user operations can also be used, such as a method of detecting a specific operation from the operation unit 70. If the system control unit 50 has determined that the voice input has started, the sequence moves to step S302, and if not, the determination process of step S301 is performed again.

In step S302, the system control unit 50 acquires voice through the voice input unit 85, and saves the acquired voice in the memory 32. In step S303, the system control unit 50 determines whether or not voice input has ended. A method in which voice input is determined to have ended when a predetermined threshold time has passed after the volume of the voice acquired from the voice input unit 85 has dropped below a predetermined threshold can be used as the method for determining that the voice input has ended. Alternatively, a determination method based on user operations can also be used, such as a method of detecting a specific operation from the operation unit 70. If the system control unit 50 has determined that the voice input has ended, the sequence moves to step S305, and if not, the sequence moves to step S304.

In step S304, the system control unit 50 determines whether or not a cancel instruction for stopping the voice input partway through has been input. A determination method based on user operations, such as a method of detecting a specific operation made using the operation unit 70, can be used as the method for determining whether the cancel instruction has been input. If the system control unit 50 has determined that the cancel instruction has been input, the sequence returns to step S301, and if not, the sequence returns to step S302.

In step S305, the system control unit 50 reads out the voice acquired in step S302 from the memory 32, performs voice recognition, and stores the voice recognition result in the memory 32. The voice may be recognized by comparing the waveform of a predetermined audio signal with the waveform of the acquired voice and determining whether the or not the waveforms are similar to each other by greater than or equal to a certain degree. Or, a trained model which has been trained using, as supervisory data, a desired recognition result to be obtained when that voice is input as for the purpose of detection may be prepared using a predetermined audio signal as an input, and the trained model may be caused to make an inference using the acquired voice as an input. In step S306, the system control unit 50 reads out the voice recognition result from the memory 32 and determines whether or not the voice recognition has succeeded on the basis of the voice recognition result. If the system control unit 50 has determined that the voice recognition has succeeded, the sequence moves to step S308, and if not, the sequence moves to step S307.

In step S307, the system control unit 50 determines whether or not voice input is to be performed again. A method in which a specific word or phrase is detected by the voice input unit 85 can be used as the method for determining whether or not voice input is to be performed again. Alternatively, a determination method based on user operations can also be used, such as a method of detecting a specific operation by the operation unit 70. If the system control unit 50 has determined that the voice input is to be performed again, the sequence returns to step S302, and if not, the sequence returns to step S301.

In step S308, the system control unit 50 determines whether or not the voice recognition result read out from the memory 32 contains a word or phrase pertaining to brightness. The "word or phrase pertaining to brightness" refers to, for example, a phrase such as "make it brighter" or "I want it darker". The word or phrase may include not only words such as "bright" and "dark", but also synonyms thereof or words and phrases having a similar meaning. If the system control unit 50 has determined that the voice recognition result contains a word or phrase pertaining to brightness, the sequence moves to step S313, and if not, the sequence moves to step S309.

In step S309, the system control unit 50 determines whether or not the voice recognition result read out from the memory 32 contains a word or phrase pertaining to enlargement or reduction (called simply "enlargement/reduction" hereinafter). The "word or phrase pertaining to enlargement/reduction" refers to, for example, a phrase such as "enlarge that" or "I want it smaller". The word or phrase may include not only words such as "enlarge" and "reduce", but also synonyms thereof or words and phrases having a similar meaning. If the system control unit 50 has determined that the voice recognition result contains a word or phrase pertaining to enlargement/reduction, the sequence moves to step S316, and if not, the sequence moves to step S310.

In step S310, the system control unit 50 determines whether or not the voice recognition result read out from the memory 32 contains a word or phrase pertaining to zooming in or zooming out (called simply "zooming in/out" hereinafter). The "word or phrase pertaining to zooming in/out" refers to, for example, a phrase such as "zoom in" or "I want to zoom out". The word or phrase may include not only phrases such as "zoom in" and "zoom out", but also synonyms thereof or words and phrases having a similar meaning. If the system control unit 50 has determined that the voice recognition result contains a word or phrase pertaining to zooming in/out, the sequence moves to step S321, and if not, the sequence moves to step S311.

In step S311, the system control unit 50 determines whether or not the voice recognition result read out from the memory 32 contains a word or phrase pertaining to muting audio (muting). The "word or phrase pertaining to muting audio" refers to, for example, a word or phrase such as "mute the sound". The word or phrase may include not only words such as "mute", but also synonyms thereof or words and phrases having a similar meaning. If the system control unit 50 has determined that the voice recognition result contains a word or phrase pertaining to muting audio, the sequence moves to step S325, and if not, the sequence moves to step S312.

In step S312, the system control unit 50 determines whether or not the voice recognition result read out from the memory 32 contains a word or phrase pertaining to deleting. The "word or phrase pertaining to deleting" refers to, for example, a word or phrase such as "clear that". The word or phrase may include not only words such as "clear", but also synonyms thereof or words and phrases having a similar meaning. If the system control unit 50 has determined that the voice recognition result contains a word or phrase pertaining to deleting, the sequence moves to step S329, and if not, the sequence moves to step S333.

A case where the voice recognition result contains a word or phrase pertaining to brightness (a case where the sequence has moved from step S308 to step S313) will be described next. In step S313, the system control unit 50 determines whether or not the digital camera 100 is in the shooting state. If the system control unit 50 has determined that the digital camera 100 is in the shooting state, the sequence moves to step S314. If not (e.g., if the digital camera 100 is in the playback/display state, the menu display state, or a communication state), the sequence moves to step S315.

Figure 4:
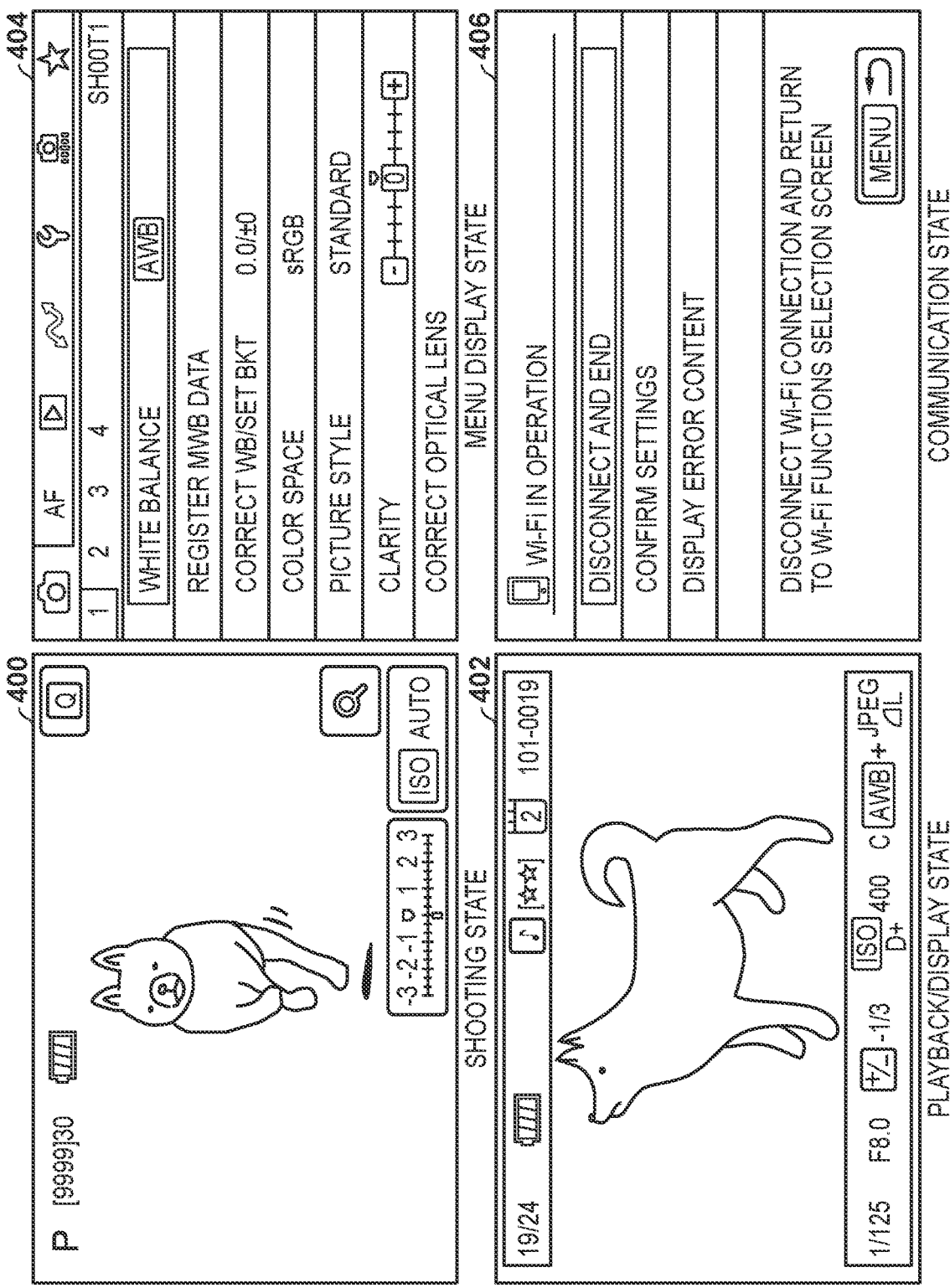
FIG. 4 is a diagram illustrating an examples of states of the digital camera 100.

An example of a method for determining whether or not the digital camera 100 is in the shooting state will be described here with reference to FIG. 4. When a display screen for shooting, such as a display screen 400 illustrated in the upper-left part of FIG. 4, is displayed in the display unit 28, the system control unit 50 can determine that the digital camera 100 is in the shooting state. This determination method can be used to determine the shooting state in other steps as well. In this manner, the system control unit 50 can determine the current state of the digital camera 100 on the basis of the content displayed in the display unit 28, but the determination method is not limited thereto.

In step S314, the system control unit 50 controls the exposure in accordance with the voice recognition result pertaining to brightness, read out from the memory 32. For example, the system control unit 50 increases the exposure if the voice recognition result is a word or phrase pertaining to increasing the brightness, such as "make it brighter", and reduces the exposure if the voice recognition result is a word or phrase pertaining to reducing the brightness, such as "make it darker". The sequence then returns to step S301.

In step S315, the system control unit 50 controls the brightness of the display unit 28 (display) in accordance with the voice recognition result pertaining to brightness, read out from the memory 32. For example, the system control unit 50 increases the brightness of the display unit 28 if the voice recognition result is a word or phrase pertaining to increasing the brightness, such as "make it brighter", and reduces the brightness of the display unit 28 if the voice recognition result is a word or phrase pertaining to reducing the brightness, such as "make it darker". The sequence then returns to step S301.

A case where the voice recognition result contains a word or phrase pertaining to enlargement/reduction (a case where the sequence has moved from step S309 to step S316) will be described next. In step S316, the system control unit 50 determines whether or not the digital camera 100 is in the shooting state. If the system control unit 50 has determined that the digital camera 100 is in the shooting state, the sequence moves to step S318. If not (e.g., if the digital camera 100 is in the playback/display state, the menu display state, or the communication state), the sequence moves to step S317.

In step S317, the system control unit 50 determines whether or not the digital camera 100 is in the playback/display state. The "playback/display state" is a state of displaying shot images so that the images can be browsed. If the system control unit 50 has determined that the digital camera 100 is in the playback/display state, the sequence moves to step S319, and if not (e.g., if the digital camera 100 is in the menu display state or the communication state), the sequence moves to step S320.

An example of a method for determining whether or not the digital camera 100 is in the playback/display state will be described here with reference to FIG. 4. When a display screen for playback (for browsing shot images), such as a display screen 402 illustrated in the lower-left part of FIG. 4, is displayed in the display unit 28, the system control unit 50 can determine that the digital camera 100 is in the playback/display state. This determination method can be used to determine the playback/display state in other steps as well.

In step S318, the system control unit 50 controls the enlargement/reduction of the live view image (LV image) displayed in the display unit 28 in accordance with the voice recognition result pertaining to enlargement/reduction, read out from the memory 32. For example, the system control unit 50 enlarges the LV image if the voice recognition result is a word or phrase pertaining to enlargement, such as "enlarge that", and reduces the LV image if the voice recognition result is a word or phrase pertaining to reduction, such as "reduce that". The sequence then returns to step S301.

In step S319, the system control unit 50 controls the enlargement/reduction of the played-back image displayed in the display unit 28 in accordance with the voice recognition result pertaining to enlargement/reduction, read out from the memory 32. For example, the system control unit 50 enlarges the played-back image (photograph) if the voice recognition result is a word or phrase pertaining to enlargement, such as "enlarge that", and reduces the played-back image (photograph) if the voice recognition result is a word or phrase pertaining to reduction, such as "reduce that". The sequence then returns to step S301.

In step S320, the system control unit 50 controls the enlargement/reduction of text displayed in the display unit 28 in accordance with the voice recognition result pertaining to enlargement/reduction, read out from the memory 32. For example, the system control unit 50 enlarges the text (font) if the voice recognition result is a word or phrase pertaining to enlargement, such as "enlarge that", and reduces the text (font) if the voice recognition result is a word or phrase pertaining to reduction, such as "reduce that". The sequence then returns to step S301.

A case where the voice recognition result contains a word or phrase pertaining to zooming in/out (a case where the sequence has moved from step S310 to step S321) will be described next. In step S321, the system control unit 50 determines whether or not the digital camera 100 is in the shooting state. If the system control unit 50 has determined that the digital camera 100 is in the shooting state, the sequence moves to step S323. If not (e.g., if the digital camera 100 is in the playback/display state, the menu display state, or the communication state), the sequence moves to step S322.

In step S322, the system control unit 50 determines whether or not the digital camera 100 is in the menu display state. The "menu display state" is a state in which a menu through which settings can be changed is displayed in the digital camera 100. If the system control unit 50 has determined that the digital camera 100 is in the menu display state, the sequence moves to step S324. If not (e.g., if the digital camera 100 is in the playback/display state or the communication state), the sequence returns to step S301.

An example of a method for determining whether or not the digital camera 100 is in the menu display state will be described here with reference to FIG. 4. When a menu display screen, such as a display screen 404 illustrated in the upper-right part of FIG. 4, is displayed in the display unit 28, the system control unit 50 can determine that the digital camera 100 is in the menu display state. This determination method can be used to determine the menu display state in other steps as well.

Additionally, if it has been determined that the digital camera 100 is in the menu display state in step S322, the system control unit 50 may specify a setting item corresponding to the voice recognition result and determine whether or not a corresponding menu item is being displayed in the display unit 28. For example, the system control unit 50 determines whether or not a menu item for instructing the enlargement/reduction of the menu screen is being displayed in the display unit 28. If a menu item for instructing the enlargement/reduction of the menu screen is being displayed in the display unit 28, the sequence moves to step S324, where the enlargement/reduction of the menu screen is controlled (described in detail later). Conversely, if a menu item for instructing the enlargement/reduction of the menu screen is not being displayed in the display unit 28, the sequence returns to step S301 without the enlargement/reduction of the menu screen being controlled.

In step S323, the system control unit 50 controls the zooming in/out of the lens unit 150 (the optical system) through the communication terminals 6 and 10 in accordance with the voice recognition result pertaining to zooming in/out, read out from the memory 32. For example, the system control unit 50 controls the lens unit 150 to zoom in if the voice recognition result is a word or phrase pertaining to zooming in, such as "zoom in". On the other hand, the system control unit 50 controls the lens unit 150 to zoom out if the voice recognition result is a word or phrase pertaining to zooming out, such as "zoom out". The sequence then returns to step S301.

In step S324, the system control unit 50 controls the enlargement/reduction of the display in the display unit 28 (the menu screen) in accordance with the voice recognition result pertaining to zooming in/out, read out from the memory 32. For example, the system control unit 50 enlarges the display screen if the voice recognition result is a word or phrase pertaining to zooming in, such as "zoom in", and reduces the display screen (e.g., sets the display to a normal size) if the voice recognition result is a word or phrase pertaining to zooming out, such as "zoom out". The sequence then returns to step S301.

A case where the voice recognition result contains a word or phrase pertaining to muting audio (muting) (a case where the sequence has moved from step S311 to step S325) will be described next. In step S325, the system control unit 50 determines whether or not the digital camera 100 is in the shooting state. If the system control unit 50 has determined that the digital camera 100 is in the shooting state, the sequence moves to step S327. If not (e.g., if the digital camera 100 is in the playback/display state, the menu display state, or the communication state), the sequence moves to step S326.

In step S326, the system control unit 50 determines whether or not the digital camera 100 is in the playback/display state or the menu display state. If the system control unit 50 has determined that the digital camera 100 is in the playback/display state or the menu display state, the sequence moves to step S328. If not (e.g., if the digital camera 100 is in the communication state), the sequence returns to step S301.

In step S327, the system control unit 50 controls the shutter 101 in accordance with the voice recognition result pertaining to muting audio (muting), read out from the memory 32. Specifically, the system control unit 50 changes the setting of the shutter 101 to a setting in which no shutter sound is emitted during shooting (a silent shutter). The sequence then returns to step S301.

In step S328, the system control unit 50 controls an audio output unit (not shown) in accordance with the voice recognition result pertaining to muting audio (muting), read out from the memory 32. Specifically, the system control unit 50 sets the audio output unit to not output operation sounds. The sequence then returns to step S301.

A case where the voice recognition result contains a word or phrase pertaining to deleting (a case where the sequence has moved from step S312 to step S329) will be described next. In step S329, the system control unit 50 determines whether or not the digital camera 100 is in the shooting state or the menu display state. If the system control unit 50 has determined that the digital camera 100 is in the playback/display state or the menu display state, the sequence moves to step S331. If not (e.g., if the digital camera 100 is in the playback/display state or the communication state), the sequence moves to step S330.

In step S330, the system control unit 50 determines whether or not the digital camera 100 is in the playback/display state. If the system control unit 50 has determined that the digital camera 100 is in the playback/display state, the sequence moves to step S332. If not (e.g., if the digital camera 100 is in the communication state), the sequence returns to step S301.

In step S331, the system control unit 50 clears (turns off) the display unit 28 in accordance with the voice recognition result pertaining to deleting, read out from the memory 32. The sequence then returns to step S301.

In step S332, the system control unit 50 deletes the played-back image (photograph) in accordance with the voice recognition result pertaining to deleting, read out from the memory 32. The played-back image to be deleted is, for example, the played-back image displayed in the display unit 28.

Alternatively, the system control unit 50 may delete two or more images. The processing for deleting the played-back image may be processing for deleting the data of the played-back image from the recording medium 200, or may be processing for moving the data of the played-back image to another folder in the recording medium 200. The sequence then returns to step S301.

A case where it is determined in step S312 that the voice recognition result does not contain a word or phrase pertaining to deleting (a case where the sequence has moved from step S312 to step S333) will be described next. In step S333, the system control unit 50 determines whether or not the digital camera 100 is in the shooting state. A determination of which shooting mode is selected out of the shooting modes which can be switched to using the mode changing switch 60 may be added to this determination. If the system control unit 50 has determined that the digital camera 100 is in the shooting state, the sequence moves to step S336. If not (e.g., if the digital camera 100 is in the playback/display state, the menu display state, or the communication state), the sequence moves to step S334.

In step S334, the system control unit 50 determines whether or not the digital camera 100 is in the menu display state. If the system control unit 50 has determined that the digital camera 100 is in the menu display state, the sequence moves to step S337. If not (e.g., if the digital camera 100 is in the playback/display state or the communication state), the sequence moves to step S335.

In step S335, the system control unit 50 determines whether or not the digital camera 100 is in the playback/display state. If the system control unit 50 has determined that the digital camera 100 is in the playback/display state, the sequence moves to step S338. If not (e.g., if the digital camera 100 is in the communication state), the sequence moves to step S339.

In step S336, the system control unit 50 performs processing pertaining to the shooting state in accordance with the voice recognition result read out from the memory 32. At this time, the system control unit 50 performs the same processing both when a UI for shooting (e.g., an exposure display) is displayed in the ocular viewfinder 16 and when the UI is displayed in the display unit 28. The sequence then returns to step S301.

In step S337, the system control unit 50 performs processing pertaining to the menu display state in accordance with the voice recognition result read out from the memory 32. The sequence then returns to step S301.

In step S338, the system control unit 50 performs processing pertaining to the playback/display state in accordance with the voice recognition result read out from the memory 32. The sequence then returns to step S301.

In step S339, the system control unit 50 performs processing pertaining to another state of the digital camera 100 in accordance with the voice recognition result read out from the memory 32. If there are multiple candidates for processing pertaining to another state and the processing to be executed cannot be determined with certainty, the system control unit 50 may perform predetermined high-priority processing, or the processing to be executed may be determined in accordance with a user input.

The other state is the communication state, for example. The communication state is a state in which the digital camera 100 can communicate with another electronic device on a network. The system control unit 50 may determine whether or not the digital camera 100 is in the communication state. If the system control unit 50 has determined that the digital camera 100 is in the communication state, the system control unit 50 performs processing pertaining to the communication state in accordance with the voice recognition result. The sequence then returns to step S301.

An example of a method for determining whether or not the digital camera 100 is in the communication state will be described here with reference to FIG. 4. When a display screen for communication, such as a display screen 406 illustrated in the lower-right part of FIG. 4, is displayed in the display unit 28, the system control unit 50 can determine that the digital camera 100 is in the communication state. This determination method can be used to determine the communication state in other steps as well.

Although a configuration in which the input sensitivity of the voice input unit 85 for voice input can be changed and set in advance through user operations may be employed, the input sensitivity is not changed in accordance with the state of the digital camera 100 (the shooting state, the playback/display state, the menu display state, the communication state, and so on).

Additionally, the processing from step S301 to step S307 (the processing from when voice input is started to when voice recognition is performed) need not be performed by the digital camera 100, and may instead be performed by a control apparatus which remotely controls the digital camera 100 by communicating with the digital camera 100 through wired or wireless communication. Or, the control apparatus may perform only the voice input from step S301 to step S304. In this case, the control apparatus which remotely controls the digital camera 100 transmits voice data to the digital camera 100 through wired or wireless communication when the voice input of step S303 has ended. The digital camera 100 performs the processing of steps S305 and on on the basis of the received voice data. Alternatively, the control apparatus may perform only the voice recognition of step S305. In this case, the digital camera 100 transmits voice data to the control apparatus through wired or wireless communication when the voice input of step S303 has ended. Then, the control apparatus performs the processing of step S305 and transmits the voice recognition result to the control apparatus through wired or wireless communication. The digital camera 100 then performs the processing of steps S306 and on the basis of the received voice recognition result. In this manner, at least some of the segments of steps S301 to S307 which can be separated from each other may be performed by the control apparatus by having the digital camera 100 and the control apparatus exchange data with each other through wired or wireless communication.

Furthermore, the processing of steps S308 to S339 may be performed by the control apparatus. In this case, the control apparatus controls the digital camera 100 to perform selected processing on the basis of the voice recognition result and the state of the digital camera 100. A case where the digital camera 100 performs the processing of steps S308 to S339 can be interpreted as a case where the digital camera 100 and the control apparatus are integrated (i.e., the control apparatus includes an image capturing apparatus).

FIG. 5 is a table showing processing details selected in accordance with the voice recognition results and the state of the digital camera 100, in accordance with the voice control processing described with reference to FIGS. 3A to 3D. However, the ways in which the voice recognition result and the states of the digital camera 100 are related to the selected processing details are not limited to the relationships illustrated in FIG. 5.

As described thus far, according to the present first embodiment, the digital camera 100 performs voice recognition, and processing to be executed is determined on the basis of the voice recognition result (a user instruction identified from the voice recognition) and the current state of the digital camera 100. Consider, for example, a case where the user instruction is a first user instruction. In this case, if the digital camera 100 is in the shooting state, the digital camera 100 performs control so as to perform first processing, whereas if the digital camera 100 is in the playback/display state or the menu display state, the digital camera 100 performs control so as to perform second processing. For example, when the first user instruction pertains to brightness, the first processing is processing for controlling the exposure in accordance with the voice recognition result, and the second processing is processing for controlling the brightness of the display unit 28 in accordance with the voice recognition result (see steps S308 and S313 to S315 in FIG. 3). Thus according to the first embodiment, the likelihood of processing matching a user's intentions being performed can be improved when controlling processing by an image capturing apparatus through the use of voice recognition.

Second Embodiment

A second embodiment will describe a configuration in which processing to be executed is specified (identified) on the basis of a voice recognition result and, when a plurality of types of processing have been specified, the processing to be executed is selected on the basis of the state of the digital camera 100. In the second embodiment, the basic configuration of the digital camera 100 is the same as in the first embodiment (see FIGS. 1A to 2). The following will primarily describe areas that are different from the first embodiment.

Figure 6:
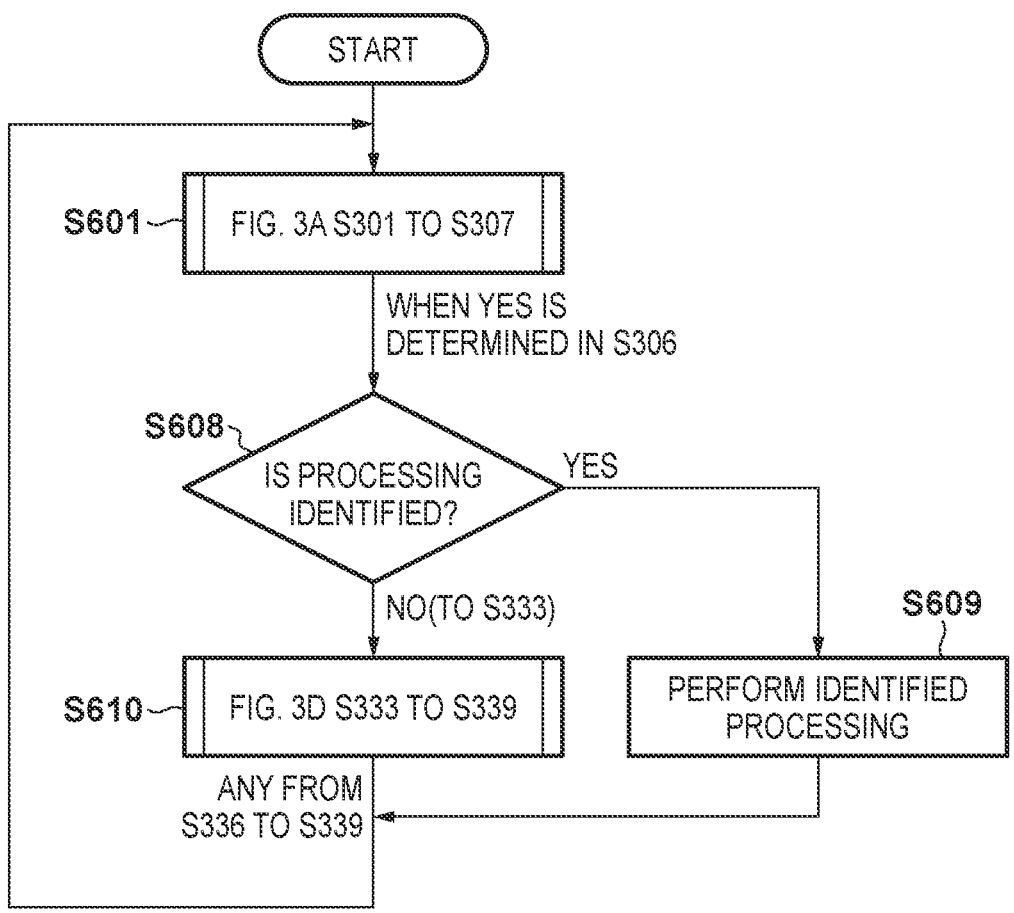
FIG. 6 is a flowchart illustrating an example of a voice control processing according to a second embodiment.

FIG. 6 is a flowchart illustrating voice control processing according to the second embodiment. Unless otherwise specified, the processing in each step of these flowcharts is realized by the system control unit 50 executing programs stored in the non-volatile memory 56 and loaded into the memory 32. The processing of step S601 is the same as that of steps S301 to S307 in FIG. 3A. If in step S306 the system control unit 50 has determined that the voice recognition has succeeded, the sequence moves to step S608.

In step S608, the system control unit 50 specifies (identifies) processing that can be executed by the digital camera 100 on the basis of the voice recognition result (user instruction) read out from the memory 32, and determines whether one type of processing has been specified, or a plurality of types of processing have been specified. For example, if the voice recognition result is "enlarge that", a plurality of types of processing are specified, i.e., processing for enlarging the LV image, processing for enlarging the played-back image, and processing for enlarging text. However, if the voice recognition result is "enlarge the played-back image", one type of processing is specified, i.e., processing for enlarging the played-back image. If one type of processing is specified, the sequence moves to step S609, and if a plurality of types of processing have been specified, the sequence moves to step S610.

In step S609, the system control unit 50 performs the processing specified in step S608. Note that in step S609, the system control unit 50 may determine whether or not the processing specified in step S608 is associated with the current state of the digital camera 100. If the processing specified in step S608 is not associated with the current state of the digital camera 100, the system control unit 50 controls the digital camera 100 to transition to a state associated with the processing specified in step S608. For example, if the processing specified in step S608 is processing for increasing the exposure and the current state of the digital camera 100 is the menu display state, the system control unit 50 controls the digital camera 100 to transition to the shooting state and increase the exposure.

Figure 3A:
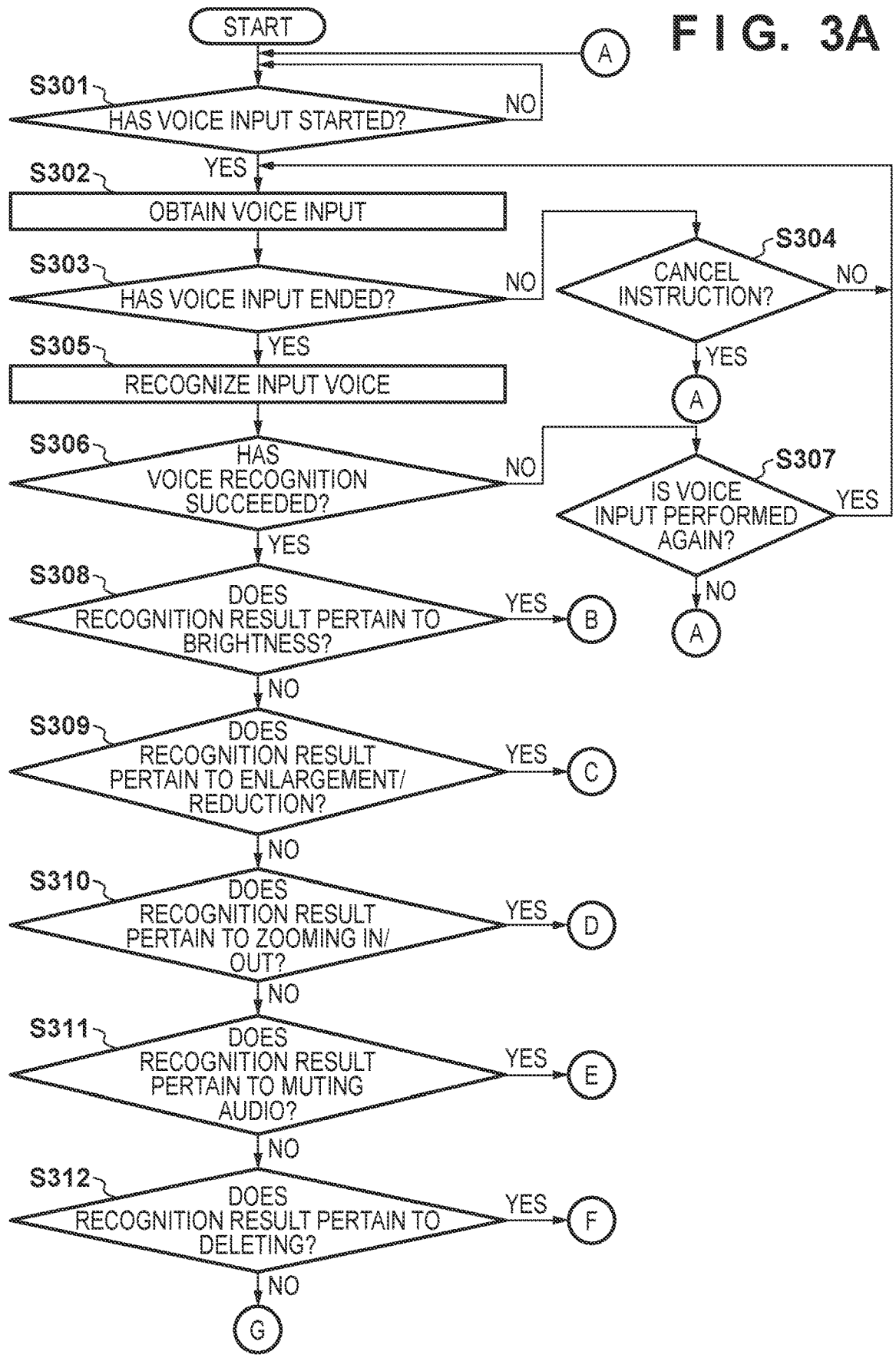
FIG. 3A is a flowchart illustrating an example of a voice control processing according to a first embodiment.
Figure 3B:
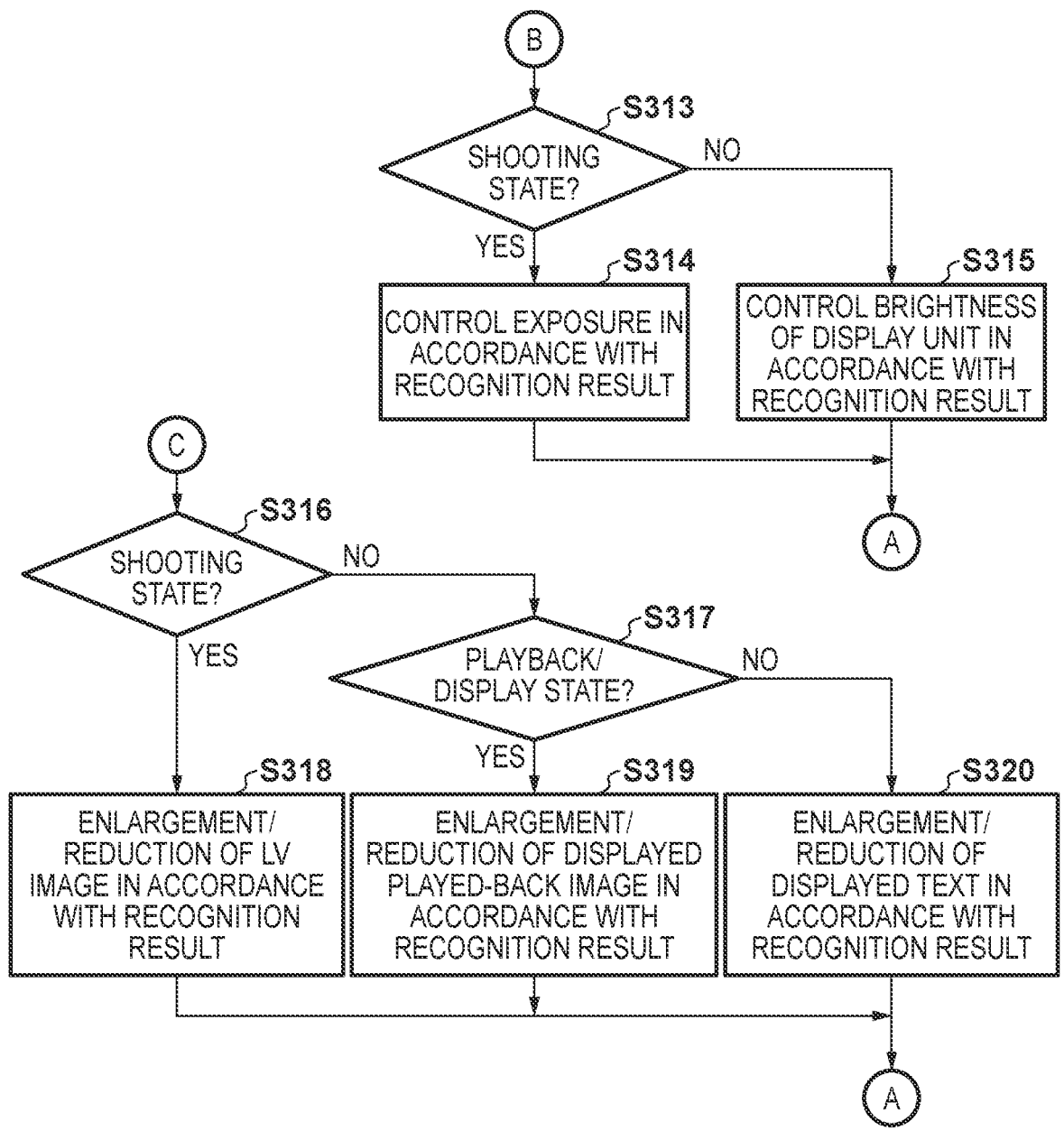
FIG. 3B is a flowchart illustrating an example of a voice control processing according to the first embodiment.
Figure 3C:
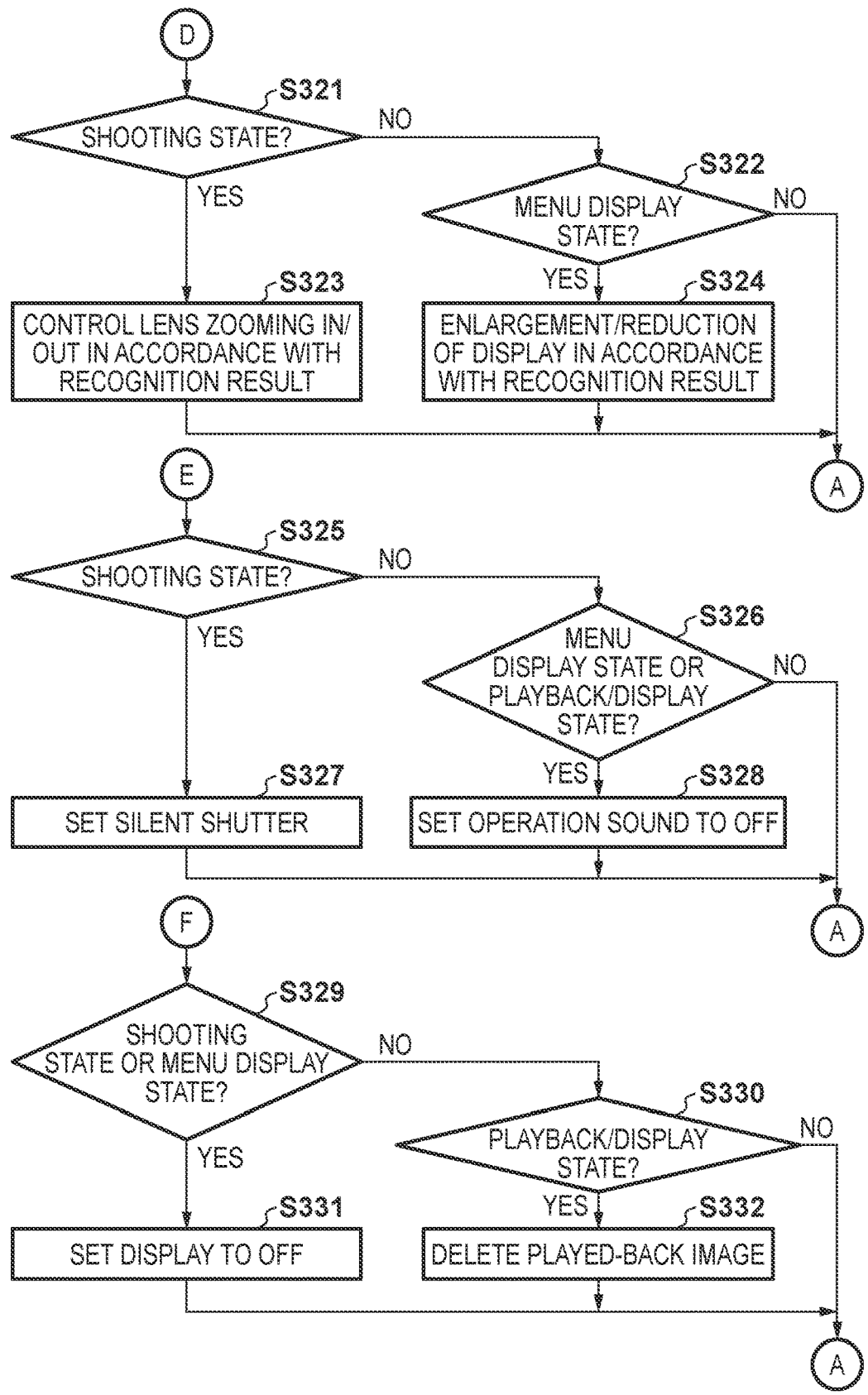
FIG. 3C is a flowchart illustrating an example of a voice control processing according to the first embodiment.
Figure 3D:
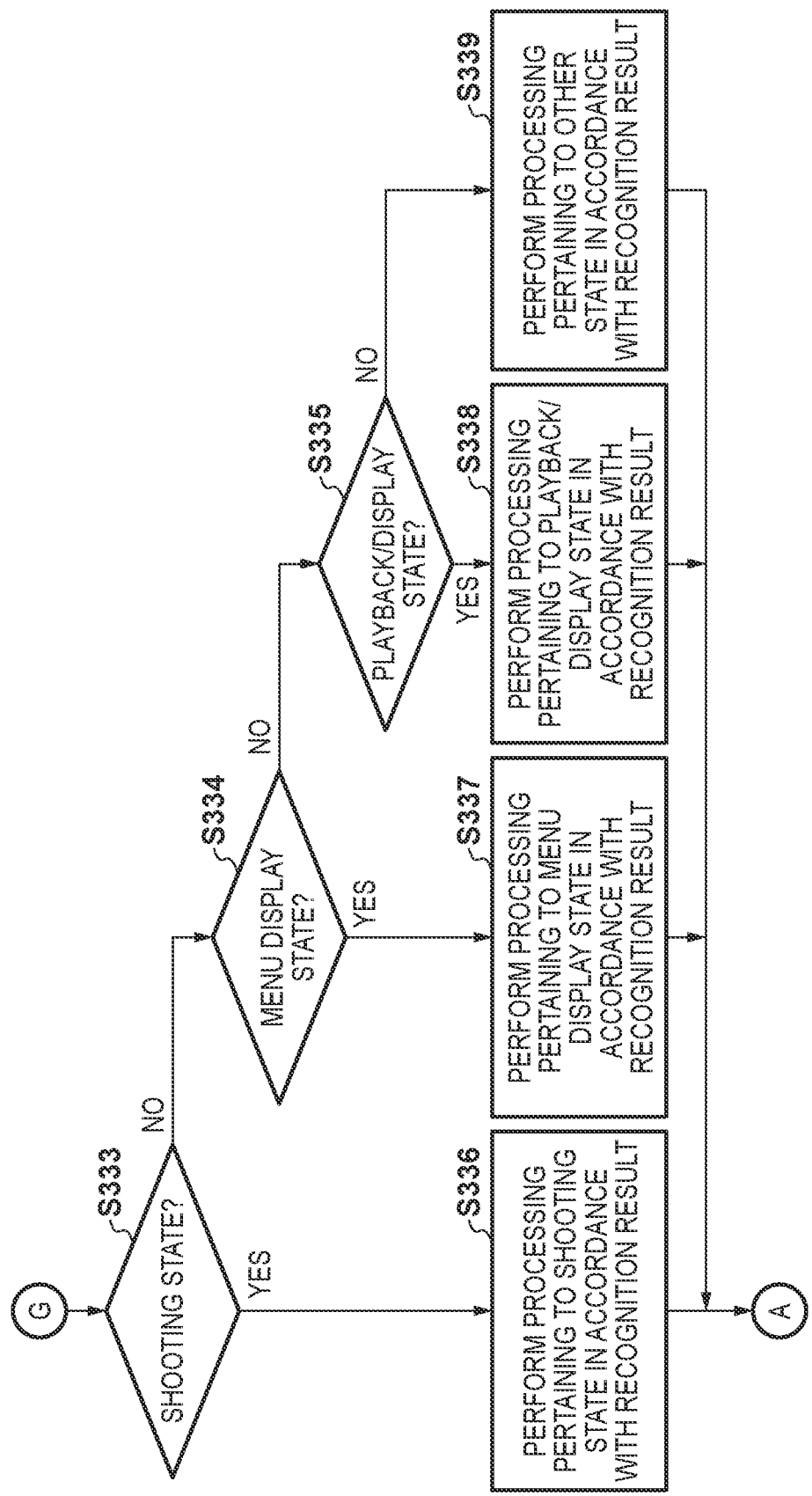
FIG. 3D is a flowchart illustrating an example of a voice control processing according to the first embodiment.

The processing of step S610 is the same as the processing of steps S333 to S339 in FIG. 3D, i.e., the system control unit 50 performs the processing, among the plurality of types of processing specified in step S608, which is associated with the current state of the digital camera 100. For example, if the processing for enlarging the LV image, the processing for enlarging the played-back image, and the processing for enlarging the text have been specified in step S608 and the current state of the digital camera 100 is the shooting state, the system control unit 50 performs the processing for enlarging the LV image in step S336.

Note that if two or more of the plurality of types of processing identified in step S608 are associated with the current state of the digital camera 100, the system control unit 50 may select one of the two or more types of processing in accordance with a predetermined priority level and execute the selected processing. Consider, for example, a case where the plurality of types of processing specified in step S608 include processing for increasing the magnification of digital zoom and processing for enlarging the LV image (where the magnification of the digital zoom does not change). In this case, the digital camera 100 executes the processing, among these two types, which has the higher priority level (e.g., the processing for enlarging the LV image). Alternatively, the system control unit 50 may execute one type of processing out of the two or more types of processing in accordance with a user operation (as opposed to the priority level).

As described thus far, according to the present second embodiment, the digital camera 100 identifies processing, corresponding to the voice recognition result (the user instruction), which the digital camera 100 can execute. If one type of processing has been identified, the digital camera 100 performs control so that the stated one type of processing is performed. However, if a plurality of types of processing have been identified, the digital camera 100 performs control so that processing, among the plurality of types of processing, which is associated with the current state of the digital camera 100 is performed. Thus according to the second embodiment, the likelihood of processing matching a user's intentions being performed can be improved when controlling processing by an image capturing apparatus through the use of voice recognition.

OTHER EMBODIMENTS

The above-described various types of control performed by the system control unit 50 may be carried out by a single piece of hardware, or the control of the apparatus as a whole may be carried out by dividing the processing up among multiple pieces of hardware (e.g., multiple processors or circuits).

Although the foregoing has described exemplary embodiment of the present disclosure is not intended to be limited to the specific embodiments, and all variations that do not depart from the essential spirit of the disclosure are intended to be included in the scope. Furthermore, the above-described embodiment is merely one embodiment and different embodiments can be combined as appropriate.

Additionally, although the foregoing embodiment describes a case where the digital camera 100 is used as an example, the present disclosure is not limited to this example, and can also be applied in any device which has image capturing means. In other words, the present disclosure can be applied in personal computers and PDAs, mobile telephone terminals, music players, game consoles, and the like.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-196615, filed Oct. 29, 2019, which is hereby incorporated by reference herein in its entirety.

What is claimed is:

1. A control apparatus comprising:
a first acquiring unit configured to acquire a user instruction identified through voice recognition;
a determining unit configured to determine a current state of an image capturing apparatus; and
a control unit configured to, in a case where the user instruction identified through the voice recognition is a first user instruction identified through the voice recognition:
control the image capturing apparatus to perform first processing in a case where the current state is a shooting state; and
control the image capturing apparatus to perform second processing in a case where the current state is a playback/display state or a menu display state,
wherein in a case where the user instruction identified through the voice recognition is a second user instruction identified through the voice recognition, the control unit:
controls the image capturing apparatus to perform third processing in a case where the current state is the shooting state;
controls the image capturing apparatus to perform fourth processing in a case where the current state is the playback/display state; and
controls the image capturing apparatus to perform fifth processing in a case where the current state is the menu display state.

2. The control apparatus according to claim 1,
wherein if the first user instruction pertains to brightness, the first processing is processing for changing an exposure of the image capturing apparatus on the basis of the first user instruction, and the second processing is processing for changing a brightness of a display of the image capturing apparatus on the basis of the first user instruction.

3. The control apparatus according to claim 1,
wherein in a case where the current state is a communication state, the control unit controls the image capturing apparatus to perform the second processing in response to the first user instruction being acquired.

4. The control apparatus according to claim 1,
wherein if the first user instruction pertains to muting audio, the first processing is processing for setting a shutter of the image capturing apparatus to a silent shutter, and the second processing is processing for turning an operation sound of the image capturing apparatus off.

5. The control apparatus according to claim 1,
wherein if the second user instruction pertains to enlargement or reduction, the third processing is processing for enlarging or reducing a live view image in a display of the image capturing apparatus on the basis of the second user instruction, the fourth processing is processing for enlarging or reducing a played-back image in the display of the image capturing apparatus on the basis of the second user instruction, and the fifth processing is processing for enlarging or reducing text in the display of the image capturing apparatus on the basis of the second user instruction.

6. The control apparatus according to claim 1,
wherein in a case where the current state is a communication state, the control unit controls the image capturing apparatus to perform the fifth processing in response to the second user instruction being acquired.

7. The control apparatus according to claim 1,
wherein in a case where the user instruction identified through the voice recognition is a third user instruction identified through the voice recognition, the control unit:
controls the image capturing apparatus to perform sixth processing in a case where the current state is the shooting state; and
controls the image capturing apparatus to perform seventh processing in a case where the current state is the menu display state.

8. The control apparatus according to claim 7,
wherein if the third user instruction pertains to zooming in or zooming out, the sixth processing is processing for controlling an optical system of the image capturing apparatus to zoom in or zoom out on the basis of the third user instruction, and the seventh processing is processing for enlarging or reducing a menu screen in a display of the image capturing apparatus on the basis of the third user instruction.

9. The control apparatus according to claim 7,
wherein in a case where the current state is the menu display state, the determining unit determines whether or not a menu item for instructing the seventh processing is being displayed in a display of the image capturing apparatus; and
if the menu item for instructing the seventh processing is being displayed in the display, the control unit controls the image capturing apparatus to perform the seventh processing in response to the third user instruction being acquired.

10. The control apparatus according to claim 1,
wherein in a case where the user instruction identified through the voice recognition is a fourth user instruction identified through the voice recognition, the control unit:
controls the image capturing apparatus to perform eighth processing in a case where the current state is the shooting state or the menu display state; and
controls the image capturing apparatus to perform ninth processing in a case where the current state is the playback/display state.

11. The control apparatus according to claim 10,
wherein if the fourth user instruction pertains to deleting, the eighth processing is processing for turning a display of the image capturing apparatus off, and the ninth processing is processing for deleting a played-back image in the display of the image capturing apparatus.

12. The control apparatus according to claim 1,
wherein the determining unit determines the current state of the image capturing apparatus on the basis of content displayed in a display of the image capturing apparatus.

13. The control apparatus according to claim 1, further comprising:
a second acquiring unit configured to acquire voice of a user; and
an identifying unit configured to identify the user instruction by performing voice recognition on the voice.

14. The control apparatus according to claim 1, further comprising the image capturing apparatus.

15. A control apparatus comprising:
a first acquiring unit configured to acquire a user instruction identified through voice recognition;
a determining unit configured to determine a current state of an image capturing apparatus;
an identifying unit configured to identify processing which corresponds to the user instruction identified through the voice recognition and which can be executed by the image capturing apparatus; and
a control unit configured to:
  in a case where one type of processing has been identified by the identifying unit, control the image capturing apparatus to perform the identified one type of processing; and
  in a case where a plurality of types of processing have been identified by the identifying unit:
    control the image capturing apparatus to perform processing, of the plurality of types of processing which have been identified, that is associated with a shooting state, if the current state is the shooting state;
    control the image capturing apparatus to perform processing, of the plurality of types of processing which have been identified, that is associated with a playback/display state, if the current state is the playback/display state; and
    control the image capturing apparatus to perform processing, of the plurality of types of processing which have been identified, that is associated with a menu display state, if the current state is the menu display state.

16. The control apparatus according to claim 15, wherein in a case where one type of processing has been identified by the identifying unit and the identified one type of processing is not associated with the current state, the control unit controls the image capturing apparatus to transition to a state associated with the identified one type of processing and perform the one type of processing.

17. The control apparatus according to claim 15, wherein in a case where the current state is the first state and two or more types of processing of the identified plurality of types of processing are associated with the first state, the control unit selects one of the two or more types of processing in accordance with a predetermined priority level and controls the image capturing apparatus to perform the selected one type of processing.

18. The control apparatus according to claim 15, wherein in a case where the current state is the first state and two or more types of processing of the identified plurality of types of processing are associated with the first state, the control unit selects one of the two or more types of processing in accordance with a user operation and controls the image capturing apparatus to perform the selected one type of processing.

19. The control apparatus according to claim 15, further comprising the image capturing apparatus.

20. A control method executed by a control apparatus, comprising:
  acquiring a user instruction identified through voice recognition;
  determining a current state of an image capturing apparatus; and
  in a case where the user instruction identified through the voice recognition is a first user instruction identified through the voice recognition:
    controlling the image capturing apparatus to perform first processing in a case where the current state is a shooting state; and
    controlling the image capturing apparatus to perform second processing in a case where the current state is a playback/display state or a menu display state; and
  in a case where the user instruction identified through the voice recognition is a second user instruction identified through the voice recognition:
    controlling the image capturing apparatus to perform third processing in a case where the current state is the shooting state;
    controlling the image capturing apparatus to perform fourth processing in a case where the current state is the playback/display state; and
    controlling the image capturing apparatus to perform fifth processing in a case where the current state is the menu display state.

21. A control method executed by a control apparatus, comprising:
  acquiring a user instruction identified through voice recognition;
  determining a current state of an image capturing apparatus;
  identifying processing which corresponds to the user instruction identified through the voice recognition and which can be executed by the image capturing apparatus;
  in a case where one type of processing has been identified, controlling the image capturing apparatus to perform the identified one type of processing; and
  in a case where a plurality of types of processing have been identified:
    controlling the image capturing apparatus to perform processing, of the plurality of types of processing which have been identified, that is associated with a shooting state, if the current state is the shooting state;
    controlling the image capturing apparatus to perform processing, of the plurality of types of processing which have been identified, that is associated with a playback/display state, if the current state is the playback/display state; and
    controlling the image capturing apparatus to perform processing, of the plurality of types of processing which have been identified, that is associated with a menu display state, if the current state is the menu display state.

22. A non-transitory computer-readable storage medium which stores a program for causing a computer to execute a control method comprising:
  acquiring a user instruction identified through voice recognition;
  determining a current state of an image capturing apparatus; and
  in a case where the user instruction identified through the voice recognition is a first user instruction identified through the voice recognition:
    controlling the image capturing apparatus to perform first processing in a case where the current state is a shooting state; and
    controlling the image capturing apparatus to perform second processing in a case where the current state is a playback/display state or a menu display state; and
  in a case where the user instruction identified through the voice recognition is a second user instruction identified through the voice recognition:
  controlling the image capturing apparatus to perform third processing in a case where the current state is the shooting state;
  controlling the image capturing apparatus to perform fourth processing in a case where the current state is the playback/display state; and controlling the image capturing apparatus to perform fifth processing in a case where the current state is the menu display state.

23. A non-transitory computer-readable storage medium which stores a program for causing a computer to execute a control method comprising:

acquiring a user instruction identified through voice recognition;

determining a current state of an image capturing apparatus;

identifying processing which corresponds to the user instruction identified through the voice recognition and which can be executed by the image capturing apparatus;

in a case where one type of processing has been identified, controlling the image capturing apparatus to perform the identified one type of processing; and in a case where a plurality of types of processing have been identified:

controlling the image capturing apparatus to perform processing, of the plurality of types of processing which have been identified, that is associated with a shooting state, if the current state is the shooting state;

controlling the image capturing apparatus to perform processing, of the plurality of types of processing which have been identified, that is associated with a playback/display state, if the current state is the playback/display state; and controlling the image capturing apparatus to perform processing, of the plurality of types of processing which have been identified, that is associated with a menu display state, if the current state is the menu display state.

\* \* \* \* \*